Feb. 14, 1928.
C. KNOWLES
1,659,270
FLEXIBLE CONNECTION
Filed Nov. 16, 1925
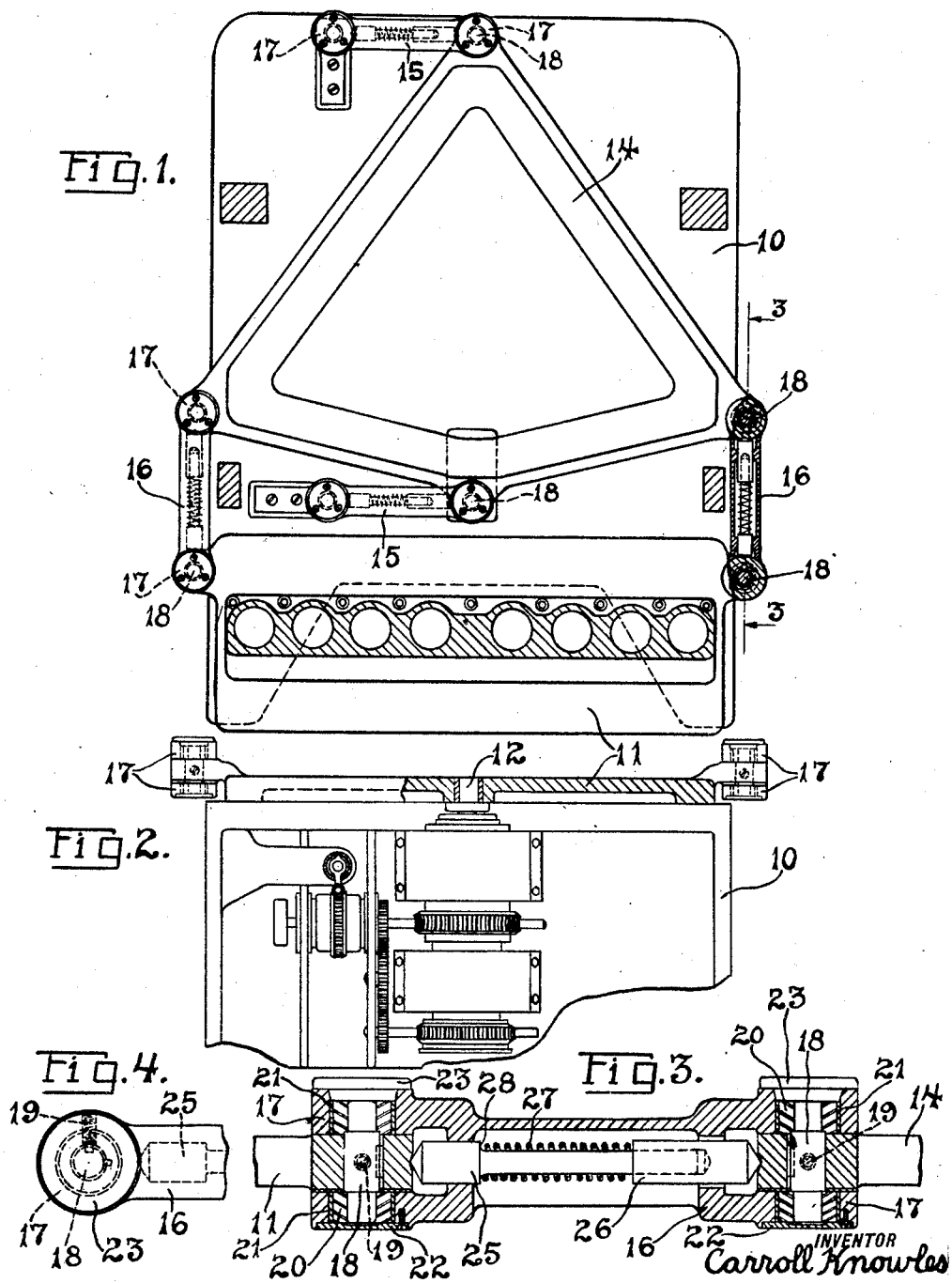
INVENTOR
Carroll Knowles
BY
Joseph F. Schofield
ATTORNEY Patented Feb. 14, 1928.

1,659,270

UNITED STATES PATENT OFFICE.

CARROLL KNOWLES, OF HARTFORD, CONNECTICUT, ASSIGNOR TO PRATT & WHITNEY COMPANY, OF NEW YORK, N. Y., A CORPORATION OF NEW JERSEY.

FLEXIBLE CONNECTION.

Application filed November 16, 1925. Serial No. 69,460.

This invention relates to flexible connections or bearings between members of a system of linkage and in particular to connections adapted to permit pivotal movement between two members of the linkage system with a minimum or entire elimination of lost motion.

An object of the present invention is to provide a connection for suitably connecting two members of a system of linkage flexibly so that there will be a constant pressure always tending to hold the members resiliently from each other and to prevent the members from moving in any other direction than angularly about fixed and definite axes.

The present invention relates particularly to an improved form of flexible connection or bearing for connecting the movable members of a system of linkage such as shown in the application of Kline et al. Serial No. 32,913, filed May 26, 1925. In a mechanism such as disclosed in the above mentioned application, the work table is given a planetary or gyratory action by means of a single eccentric working in combination with a system of linkage. The members of this linkage are constrained to move in definite curved paths, and, to maintain them in operation in these definite paths requires that all possibility of free or lost motion between the links of the mechanism be eliminated or so disposed that it cannot effect the precision of the circular movement of the table. For this purpose the pivotal bearings about which the members move are forced constantly in one direction with a sufficient pressure to maintain the journal always pressing on the same side of their bearing surfaces.

In the particular embodiment of the invention illustrated the base and an intermediate member, and the intermediate member and the work table are connected by parallel links disposed in pairs. The flexible connections forming the present invention are provided between each of the joints of the linkage, one of which only will be described in detail.

With these and other objects in view, my invention consists in the features of construction and operation set forth in the following specification and illustrated in the accompanying drawing.

In the accompanying drawing annexed hereto and forming a part of this specification, I have shown my invention embodied in a multiple cylinder grinding machine, but it will be understood that the invention can be otherwise embodied and that the drawing is not to be construed as defining or limiting the scope of the invention, the claims appended to this specification being relied upon for that purpose.

In the drawing:

Figure 1 is a plan view of the system of linkage for which the improved pivotal bearing has been designed.

Fig. 2 is a front elevation, partly in section, of the linkage shown in Fig. 1.

Fig. 3 is an elevation in section of one of the links showing two of the improved bearings at opposite ends of one of the links.

Fig. 4 is a plan view of one of the bearings and a portion of a link.

In the above mentioned drawing I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: first, a link designed to be pivotally mounted at its opposite ends to members of a system of linkage; second, alined bearings provided on the members, and a journal member secured to the link so that the journal engages the bearing surfaces on the first member; and third, resilient means normally forcing the journal constantly in one direction toward one side of the bearing surfaces.

Referring more in detail to the figures of the drawing, I provide a base 10 on which is mounted a table 11 adapted for movement in a horizontal plane thereon in any direction. By means of an eccentric 12, the eccentricity of which may be varied, this table 11 is given a circular motion of any predetermined radius. By means of the linkage connecting the table 11 to the base 10 each point in the table 11 is constrained to move in a circular path of identical radius. The linkage shown in Figs. 1 and 2 is substantially similar to that shown and described in the above mentioned copending application so that a detail description thereof is not thought to be necessary.

This linkage, it will be seen, comprises an intermediate member 14 substantially of triangular form attached to the base 10 at spaced points by links 15 disposed parallelly to each other. The table 11 is attached to the triangular or intermediate member 14 by similar parallelly disposed links 16 extending substantially normally to the first pair of links 15. It will be seen that if any of the pivotal connections between the members of this linkage system are loose the circular or planetary motion of the table 11 will be slightly distorted. In order to maintain this motion of the table 11 within precise limits so that each point of the table 11 will travel in a circle of definite and identical radius, special bearings 17 have been designed for connecting the links 15 and 16 to the base 10, the intermediate member 14 and the table 11. These bearings are designed to eliminate any errors due to lost motion between the members pivotally connected together by constantly taking up any lost motion in the same direction.

This improved form of bearing 17 is shown most clearly in Fig. 3 which shows at one end a fragmentary part of the intermediate member 14 connected by one of the links 16 to the table 11. The opposite end of the link 16 is provided with a similar bearing 17 pivotally connecting it to a portion of the table 11. As seen in this figure, the bearing 17 at the right end of the link 16 comprises a journal member 18 suitably secured within the intermediate member 14. Preferably, this journal member 18 is keyed to the linkage member 14 and also held against possible endwise movement by means of a screw 19. From opposite ends of this journal member 17 extend portions above and below the intermediate member 14. These surfaces are engaged by the rollers 20 of an anti-friction bearing on each end of the journal 18, the outer portions of the rollers all being in engagement with a ring 21 fastened into the end of the link 16. These two bearings are, in the preferred embodiment, of the well-known Hyatt form of bearing, and are disposed in axial alinement with each other. Retaining them in position is a bottom plate 22 closing the bottom opening in the link 16 suitably held to the link 16 and, by a removable cap 23 closing the upper end of this opening.

The bearing 17 at the opposite end of the link 16 and upon each end of the links 15 and 16 is precisely similar in every way to the one just described so that further description is not thought to be necessary.

In alinement with each of the links 16 and engaging a portion of the intermediate member 14 and the table 11, is an extendable rod preferably made as shown in two parts 25 and 26 telescoping one with the other. This rod in the embodiment illustrated is housed within the link and supported within suitable openings therein. Between the two members 25 and 26 of the rod is a coiled compressed spring 27 surrounding the reduced portion of one of the members 25 and having one end forced against a shoulder 28. The opposite end of the spring 27 is forced against the end of the member 26. By means of this spring 27 the intermediate member 14 and the table 11 are constantly forced as far apart as permitted by the interconnecting link 16 and at all times the pressure of the coiled spring 27 is sufficient to maintain the journals 18 in the intermediate member 14 and the table 11 in contact with the rollers 20 in engagement with one side of the bearing surfaces on the rings 21. With the bearings held in this position the link 16 may pivot about the member 11 at one end and about the member 14 at its opposite end. It will therefore be seen that no lost motion between the intermediate member 14 and table 11 is permitted while they are movable relative to each other, but that this lost motion is constantly taken up by means of the coiled spring 27. Similarly each of the links 15 and 16 hold the base 10 and intermediate member 14, and the intermediate member 14 and table 11 as far apart as possible while permitting similar relative movement.

What I claim is:

1. A connecting means for two members adapted for movement relative to each other comprising in combination, a link disposed between said members, spaced roller bearings aligned relatively to each other disposed at each end of said link, journals positioned in said members extending above and below said members and adapted to contact with said roller bearings in said link, and resilient means constantly forcing said members in opposite directions, whereby said bearings will constantly be forced against said journals and all lost motion between said bearings and journals will be prevented.

2. A connecting means for two members adapted for movement relative to each other comprising in combination, a link disposed between said members, spaced roller bearings aligned relatively to each other disposed at each end of said link, journals positioned in said members extending above and below said members and adapted to contact with said roller bearings in said link, and resilient means extending longitudinally through said link and constantly forcing said members in opposite directions, whereby said bearings will constantly be forced against said journals and all lost motion between said bearings and journals will be prevented.

3. A connecting means for two members adapted for movement relative to each other comprising in combination, a link disposed between said members, spaced roller bearings aligned relatively to each other disposed at each end of said link, journals positioned in said members extending above and below said members and adapted to contact with said roller bearings in said link, and a telescoping rod between said members and disposed within said link, a coiled spring engaging the portions of said telescoping rod whereby said rod constantly forces said members in opposite directions, whereby said bearings will constantly be forced against said journals and all lost motion between said bearings and journals will be prevented.

In testimony whereof, I hereto affix my signature.

CARROLL KNOWLES.